(12) United States Patent  (10) Patent No.: US 9,552,571 B2
Jain et al.  (45) Date of Patent: Jan. 24, 2017

(54) ELECTRONIC DEVICE AND METHOD OF MEETING NOTIFICATION

(75) Inventors: Rohit Rocky Jain, Waterloo (CA); Darrell R. May, Waterloo (CA)

(73) Assignee: BLACKBERRY LIMITED, Waterloo (CA)

( * ) Notice: Subject to any disclaimer, the term of this patent is extended or adjusted under 35 U.S.C. 154(b) by 2334 days.

(21) Appl. No.: 11/670,488

(22) Filed: Feb. 2, 2007

(65) Prior Publication Data

US 2008/0189159 A1  Aug. 7, 2008

(51) Int. Cl.
| | |
|---|---|
| G06Q 10/00 | (2012.01) |
| G06Q 10/10 | (2012.01) |
| H04M 3/42 | (2006.01) |
| G06F 17/30 | (2006.01) |
| G06Q 10/06 | (2012.01) |
| H04M 3/56 | (2006.01) |

(52) U.S. Cl.
CPC ........... *G06Q 10/109* (2013.01); *G06F 17/30* (2013.01); *G06Q 10/1093* (2013.01); *G06Q 10/1095* (2013.01); *G06Q 10/1097* (2013.01); *H04M 3/42* (2013.01); *G06Q 10/063116* (2013.01); *H04M 3/56* (2013.01)

(58) Field of Classification Search
None
See application file for complete search history.

(56) References Cited

U.S. PATENT DOCUMENTS

| | | | |
|---|---|---|---|
| 4,626,836 A * | 12/1986 | Curtis et al. | 345/156 |
| 4,819,191 A | 4/1989 | Scully et al. | |
| 5,070,470 A * | 12/1991 | Scully et al. | 708/112 |
| 5,093,901 A | 3/1992 | Cree et al. | |
| 5,528,745 A | 6/1996 | King et al. | |
| 5,692,125 A | 11/1997 | Schloss et al. | |
| 5,845,257 A | 12/1998 | Fu et al. | |
| 5,893,073 A | 4/1999 | Kasso et al. | |
| 5,943,652 A * | 8/1999 | Sisley | G06Q 10/06 705/7.16 |

(Continued)

FOREIGN PATENT DOCUMENTS

| | | |
|---|---|---|
| CA | 2525299 | 5/2006 |
| EP | 0 276 425 A2 | 8/1988 |

(Continued)

OTHER PUBLICATIONS

Jarvie D. Manuel de Kalarm: Internet Document, [Online], Jul. 21, 2005 (Jul. 21, 2005), pp. 1-50, XP002444649, retrieved from the Internet: URL:http://docs.kde.org/stable/fr/kdepim/kalarm/index.html>[retrieved on Jul. 7, 2007], p. 3; p. 9-p. 20; p. 31.

(Continued)

*Primary Examiner* — Gurkanwaljit Singh
(74) *Attorney, Agent, or Firm* — Perry + Currier Inc.

(57) ABSTRACT

A method of providing a meeting notification includes adding an indication of an observer to a calendar event in a calendar graphical user interface at an organizer electronic device, saving the calendar event associated with the observer at the organizer electronic device, and sending an observer electronic message from the organizer electronic device to an observer electronic device. The observer electronic message includes the calendar event for storage at the observer electronic device with a period of time, associated with the calendar event, indicated as free time.

14 Claims, 21 Drawing Sheets

(56) References Cited

U.S. PATENT DOCUMENTS

| | | | |
|---|---|---|---|
| 5,966,714 | A | 10/1999 | Huang et al. |
| 5,968,131 | A | 10/1999 | Mendez et al. |
| 6,016,478 | A * | 1/2000 | Zhang ............ G06Q 10/06314 705/7.19 |
| 6,085,166 | A * | 7/2000 | Beckhardt et al. .......... 705/7.18 |
| 6,101,480 | A * | 8/2000 | Conmy et al. ............... 705/7.18 |
| 6,131,096 | A | 10/2000 | Ng et al. |
| 6,266,295 | B1 * | 7/2001 | Parker et al. .................. 368/28 |
| 6,272,074 | B1 | 8/2001 | Winner |
| 6,275,831 | B1 | 8/2001 | Bodnar et al. |
| 6,360,217 | B1 | 3/2002 | Gopal et al. |
| 6,363,352 | B1 | 3/2002 | Dailey et al. |
| 6,388,772 | B1 * | 5/2002 | Williams ..................... 358/448 |
| 6,404,884 | B1 | 6/2002 | Marwell et al. |
| 6,457,062 | B1 | 9/2002 | Pivowar et al. |
| 6,466,236 | B1 | 10/2002 | Pivowar et al. |
| 6,466,951 | B1 | 10/2002 | Birkler et al. |
| 6,470,329 | B1 | 10/2002 | Livschitz |
| 6,560,655 | B1 * | 5/2003 | Grambihler et al. ........ 709/248 |
| 6,594,637 | B1 | 7/2003 | Furukawa et al. |
| 6,611,849 | B1 | 8/2003 | Raff et al. |
| 6,732,080 | B1 | 5/2004 | Blants |
| 6,785,868 | B1 | 8/2004 | Raff |
| 6,820,096 | B1 * | 11/2004 | Kanevsky et al. |
| 6,879,996 | B1 | 4/2005 | Laves |
| 6,988,128 | B1 * | 1/2006 | Alexander et al. .......... 709/206 |
| 6,999,731 | B2 * | 2/2006 | Cronin ........................... 455/88 |
| 6,999,993 | B1 * | 2/2006 | Shah et al. ................... 709/207 |
| 7,082,402 | B2 * | 7/2006 | Conmy et al. ............... 705/7.19 |
| 7,149,810 | B1 | 12/2006 | Miller et al. |
| 7,188,073 | B1 * | 3/2007 | Tam ....................... G06Q 10/02 705/5 |
| 7,224,963 | B2 * | 5/2007 | Anderson et al. ........ 455/414.3 |
| 7,334,000 | B2 | 2/2008 | Chhatrapati et al. |
| 7,340,691 | B2 | 3/2008 | Bassett et al. |
| 7,343,312 | B2 | 3/2008 | Capek et al. |
| 7,359,920 | B1 | 4/2008 | Rybicki et al. |
| 7,369,750 | B2 * | 5/2008 | Cheng et al. ................. 386/292 |
| 7,395,221 | B2 * | 7/2008 | Doss et al. ................... 705/7.19 |
| 7,584,278 | B2 * | 9/2009 | Rajarajan et al. ........... 709/226 |
| 7,703,048 | B2 | 4/2010 | Alford, Jr. et al. |
| 7,716,078 | B2 | 5/2010 | Bourne et al. |
| 7,747,458 | B2 * | 6/2010 | Lyle et al. ................... 705/7.19 |
| 7,747,459 | B2 * | 6/2010 | Doss et al. ................... 705/7.19 |
| 7,752,066 | B2 * | 7/2010 | Doss et al. ................... 705/7.19 |
| 7,818,198 | B2 * | 10/2010 | Masselle ............. G06Q 10/109 705/7.18 |
| 7,881,233 | B2 | 2/2011 | Bieselin |
| 7,984,378 | B1 | 7/2011 | Atkins et al. |
| 2001/0014866 | A1 * | 8/2001 | Conmy et al. .................... 705/9 |
| 2001/0014867 | A1 * | 8/2001 | Conmy ............................. 705/9 |
| 2001/0044903 | A1 * | 11/2001 | Yamamoto et al. .......... 713/200 |
| 2001/0049638 | A1 * | 12/2001 | Satoh ..................... G06Q 30/016 705/26.44 |
| 2002/0016729 | A1 * | 2/2002 | Breitenbach et al. ............ 705/9 |
| 2002/0029161 | A1 * | 3/2002 | Brodersen ............. G06Q 10/06 705/7.14 |
| 2002/0044149 | A1 * | 4/2002 | McCarthy et al. ............ 345/581 |
| 2002/0131565 | A1 * | 9/2002 | Scheuring ............ G06Q 10/109 379/88.19 |
| 2002/0138326 | A1 * | 9/2002 | Parker et al. ..................... 705/9 |
| 2002/0143877 | A1 | 10/2002 | Hackbarth et al. |
| 2002/0188609 | A1 | 12/2002 | Fukuta et al. |
| 2002/0196280 | A1 | 12/2002 | Bassett et al. |
| 2003/0004773 | A1 * | 1/2003 | Clark et al. ..................... 705/8 |
| 2003/0028399 | A1 * | 2/2003 | Davis et al. ..................... 705/2 |
| 2003/0030751 | A1 * | 2/2003 | Lupulescu et al. ........... 348/552 |
| 2003/0046304 | A1 * | 3/2003 | Peskin et al. ............... 707/104.1 |
| 2003/0061303 | A1 | 3/2003 | Brown et al. |
| 2003/0065742 | A1 | 4/2003 | Culp et al. |
| 2003/0069899 | A1 | 4/2003 | Brown et al. |
| 2003/0097561 | A1 * | 5/2003 | Wheeler et al. .............. 713/168 |
| 2003/0100336 | A1 * | 5/2003 | Cronin .......................... 455/556 |
| 2003/0130882 | A1 * | 7/2003 | Shuttleworth ........ G06Q 10/109 709/204 |
| 2003/0149605 | A1 * | 8/2003 | Cragun et al. ..................... 705/8 |
| 2003/0149606 | A1 * | 8/2003 | Cragun et al. ..................... 705/8 |
| 2003/0154116 | A1 | 8/2003 | Lofton |
| 2003/0171973 | A1 * | 9/2003 | Wilce et al. ...................... 705/9 |
| 2003/0204474 | A1 | 10/2003 | Capek |
| 2003/0233265 | A1 | 12/2003 | Lee et al. |
| 2004/0031035 | A1 * | 2/2004 | Shiu et al. .................... 718/102 |
| 2004/0054726 | A1 | 3/2004 | Doss et al. |
| 2004/0078256 | A1 * | 4/2004 | Glitho et al. ..................... 705/8 |
| 2004/0093290 | A1 * | 5/2004 | Doss et al. ..................... 705/35 |
| 2004/0122721 | A1 * | 6/2004 | Lasorsa ................ G06Q 10/109 705/7.24 |
| 2004/0125142 | A1 * | 7/2004 | Mock et al. .................... 345/765 |
| 2004/0139452 | A1 * | 7/2004 | Hope et al. .................... 719/318 |
| 2004/0162882 | A1 * | 8/2004 | Mora ............................. 709/207 |
| 2004/0167877 | A1 * | 8/2004 | Thompson, III ................. 707/3 |
| 2004/0216168 | A1 * | 10/2004 | Trovato et al. ................ 725/135 |
| 2005/0020314 | A1 * | 1/2005 | Choi ............................ 455/564 |
| 2005/0085272 | A1 * | 4/2005 | Anderson et al. ............ 455/566 |
| 2005/0091399 | A1 * | 4/2005 | Candan ............. H04L 29/06027 709/238 |
| 2005/0102328 | A1 | 5/2005 | Ring et al. |
| 2005/0114777 | A1 | 5/2005 | Szeto |
| 2005/0192857 | A1 | 9/2005 | Levine |
| 2005/0192973 | A1 | 9/2005 | Sperling et al. |
| 2005/0256737 | A1 | 11/2005 | Liu |
| 2006/0021465 | A1 | 2/2006 | Ushida |
| 2006/0041460 | A1 * | 2/2006 | Aaron ....................... G09B 7/00 705/7.18 |
| 2006/0053380 | A1 | 3/2006 | Spataro et al. |
| 2006/0080427 | A1 | 4/2006 | Yach |
| 2006/0106881 | A1 | 5/2006 | Leung et al. |
| 2006/0177034 | A1 * | 8/2006 | Reding ..................... H04M 3/46 379/211.02 |
| 2006/0190485 | A1 | 8/2006 | Adams et al. |
| 2006/0212465 | A1 | 9/2006 | Fish |
| 2006/0218224 | A1 | 9/2006 | Agrawal et al. |
| 2006/0247962 | A1 | 11/2006 | Harvey et al. |
| 2007/0016646 | A1 | 1/2007 | Tendjoukian et al. |
| 2007/0100856 | A1 | 5/2007 | Ebbesen |
| 2007/0101284 | A1 * | 5/2007 | Shaw et al. .................... 715/772 |
| 2007/0112880 | A1 | 5/2007 | Yang et al. |
| 2007/0230282 | A1 * | 10/2007 | May ........................ G04G 11/00 368/29 |
| 2007/0239506 | A1 * | 10/2007 | Jania ..................... G06Q 10/109 705/7.18 |
| 2008/0040188 | A1 | 2/2008 | Klausmeier |
| 2008/0091504 | A1 * | 4/2008 | Lyle ................ G06Q 10/063116 705/7.19 |
| 2008/0126476 | A1 | 5/2008 | Nicholas et al. |
| 2008/0141145 | A1 | 6/2008 | Klausmeier |
| 2008/0178110 | A1 | 7/2008 | Hill et al. |
| 2008/0207263 | A1 * | 8/2008 | May ................... H04M 1/72566 455/556.2 |
| 2009/0019367 | A1 | 1/2009 | Cavagnari et al. |
| 2010/0058246 | A1 | 3/2010 | Bedingfield, Sr. |
| 2010/0100632 | A1 | 4/2010 | Qureshi et al. |
| 2011/0054976 | A1 * | 3/2011 | Adler .................... G06Q 10/109 705/7.18 |
| 2011/0161130 | A1 | 6/2011 | Whalin et al. |
| 2011/0295641 | A1 | 12/2011 | Guiheneuf et al. |

FOREIGN PATENT DOCUMENTS

| | | |
|---|---|---|
| EP | 1569141 A | 8/2005 |
| EP | 1655693 A | 5/2006 |
| GB | 2375017 A | 10/2002 |
| WO | 00/62201 A | 10/2000 |
| WO | 0244958 A | 6/2002 |
| WO | 2005/116892 A | 12/2005 |

OTHER PUBLICATIONS

Faure De, et al.: "KDE Kontact: an application integration framework—PIM components get together" Proceedings of the USENIX

(56) References Cited

OTHER PUBLICATIONS

Annual Technical Conference, XX,XX, 2004, pp. 115-126, XP002363478. The whole document.
Internet Archive Wayback Machine Search Result, [on line] Jul. 27, 2007, XP002444552, retrieved from the Internet: URL:http://web.archive.org/web/*/http://docs.kde.org/stable/en/kdepim/korganizer/korganizer.pdf> [retrieved on Jul. 27, 2007].
"Lotus Notes (R5) Client calendaring" Internet Citation, [Online] Nov. 2, 2001 (Nov. 2, 2001), XP002302478 Retrieved from the Internet: URL:http://web.archive.org/web/20011102175413/http//www.rhsmith.umd.edu/tr/LNR5Cal.htm> [retrieved on Oct. 22, 2004]. The whole document.
Nagendra Nyamgondalu: "Lotus Notes Calendar and Scheduling explained Part 1" Internet Citation, [Online] Oct. 18, 2004 (Oct. 18, 2004), XP002363424 Retrieved from the Internet: URL:http://www-128.ibm.com/developerworks/lotus/library/cs-pt1/> [retrieved on Jan. 81, 2006], pp. 3-6.
Microsoft Corp., Microsoft Outlook 2000,1995-1999, pages Msoutlook Fig.1-Fig.6.
De Herrera, Chris: "Storing Personal and Business Information on Your Pocket PC or Smartphone" [online] Apr. 16, 2005, pp. 1-4, XP002456519, URL: http://www.pocketpcfaq.com/security/personal-business05.htm [retrieved Oct. 24, 2007].
Woelz, C.L, et al. "The KOrganizer Handbook (Chapter 3-Chapter 7)", Internet Docuoment, Aug. 29, 2005, pp. 1-62, XP002444605.
Outlook 2007 Help, downloaded from http://office.microsoft.com/client/helppreview.aspx?AssetId=HA012302499990&lcid=103 . . . Mar. 14, 2011.
Outlook 2007 (12.0.4518.1014)—Screen Shot.
Author: David Pogue; Title: PalmPilot—The Ultimate Guide; Date: 2000; pp. 3-4, 53-98.
Author: Microsoft; Title: Create tasks and to-do items; Date: Nov. 8, 2006; p. 1-9.
Author: David Pogue; Title: Palm Pilot—the ultimate guide; Date: 1998; p. 3 4, 44-63.
Author: University of Wisconsin; Title: Creating Flags and Reminders in Outlook; Date: Apr. 25, 2003; p. 1-6.
Related Canadian Patent Application No. 2619399 Office Action dated Apr. 2, 2012.
Bill Dyszel, "Outlook 2003 for Dummies" Oct. 3, 2003, 384 pages. (Abstract).
DiGiacomo, P., et al., Special Edition Using Microsoft Office Outlook 2007, Dec. 26, 2006, Pertinent pp. 18-19; 290-293; 312, 313.
Palen; Social, Individual & Technological Issues for Groupware Calendar Systems (Department of Computer Science, Univeristy of Colorado, Boulder) May 20, 1999 (May 20, 1999).
Woelz C.L. et al. "The KOrganizer Handbook (chapter 3-chapter 7)", Aug. 29, 2005, XP002444605, retrieved from the internet: URL:http://docs.kde.org/stable/en/kdepim/korganizer/index.html(retrieved on Jul. 26, 2007, pp. 3-4, 24-32, 36-40, 46-47.
Outlook 2007 Help, downloaded from https://support.office.com/en-ca/article/Share-your-calendar-information-353ed2c1-3ec5-449d-8c73-6931 on Mar. 14, 2011.

\* cited by examiner

| Calendar | |
|---|---|
| 8:00 | |
| 9:00 | |
| 10:00 | |
| 11:00 | |
| 12:00 | |
| 1:00 | |
| 2:00 | |
| 3:00 | |
| 4:00 | |
| 5:00 | |

FIG. 5

| Calendar | |
|---|---|
| 8:00 | Go To Date... |
| | Prev. Day |
| 9:00 | Next Day |
| | Prev. Week |
| 10:00 | Next Week |
| | New |
| 11:00 | Open |
| | Delete |
| 12:00 | View Week |
| | View Month |
| 1:00 | Close |
| 2:00 | |
| 3:00 | |
| 4:00 | |
| 5:00 | |

FIG. 6

| Appointment Details | |
|---|---|
| Subject: | Group Meeting |
| Location: | Board Room 1 |

☐ All Day Event
Start: Mon. Jan. 15, 2007  10:00 AM
End:  Mon. Jan. 15, 2007  11:00 AM
Duration:           1 Hour  0 Mins
Time Zone:                  EST (-5)
Show Time As:                   Busy
Reminder:                    15 Mins
Invitees:
Peter Smith <p.smith@pp1.com>
Sandra Jones <s.jones@pp1.com>

Notes:

FIG. 7

| Appointment I | Paste |
|---|---|
| Subject:    Gro | Select |
| Location:    Boa | Clear Field |
| ☐ All Day Event | Send |
| Start: Mon. Jan. 15, | Delete |
| End: Mon. Jan. 15, | Show Symbols |
| Duration: | Add Invitee |
| Time Zone: | Add Observer |
| Show Time As: | Close |

Reminder:                    15 Mins
Invitees:
Peter Smith <p.smith@pp1.com>
Sandra Jones <s.jones@pp1.com>

Notes:

FIG. 8

| Appointment Details | |
|---|---|
| Subject: | Group Meeting |
| Location: | Board Room 1 |
| ☐ All Day Event | |
| Start: Mon. Jan. 15, 2007 | 10:00 AM |
| End: Mon. Jan. 15, 2007 | 11:00 AM |
| Duration: | 1 Hour 0 Mins |
| Time Zone: | EST (-5) |
| Show Time As: | Busy |
| Reminder: | 15 Mins |
| Invitees: | |
| Peter Smith <p.smith@pp1.com> | |
| Sandra Jones <s.jones@pp1.com> | |
| Observers: | |
| Bill Johnson <b.johnson@pp1.com> | |
| Notes: | |

FIG. 9

| Appointment I | Paste |
|---|---|
| Subject: Gro | Select |
| Location: Boa | Clear Field |
| | Send |
| ☐ All Day Event | Delete |
| Start: Mon. Jan. 15, | Show Symbols |
| End: Mon. Jan. 15, | Add Invitee |
| Duration: | Add Observer |
| Time Zone: | Close |
| Show Time As: | |
| Reminder: | 15 Mins |
| Invitees: | |
| Peter Smith <p.smith@pp1.com> | |
| Sandra Jones <s.jones@pp1.com> | |
| Observers: | |
| Bill Johnson <b.johnson@pp1.com> | |
| Notes: | |

FIG. 10

| Appointment Details | |
|---|---|
| Subject: Group Meeting<br>Location: Board Room 1 | |
| ☐ All Day Event<br>Start: Mon. Jan. 15, 2007  10:00 AM<br>End: Mon. Jan. 15, 2007  11:00 AM<br>Duration:              1 Hour  0 Mins<br>Time Zone:                      EST (-5)<br>Show Time As:                      Free<br>Reminder:                          None<br>Invitees:<br>Peter Smith <p.smith@pp1.com><br>Sandra Jones <s.jones@pp1.com><br>Observers:<br>Bill Johnson <b.johnson@pp1.com> | |
| Notes: | |

FIG. 17

| Appointment I | Change Option |
|---|---|
| | Save |
| Subject: Gro | Discard |
| Location: Boa | Delete |
| ☐ All Day Event | Close |
| Start: Mon. Jan. 15, 2007 10:00 AM | |
| End: Mon. Jan. 15, 2007 11:00 AM | |
| Duration: | 1 Hour 0 Mins |
| Time Zone: | EST (-5) |
| Show Time As: | Busy |
| Reminder: | 15 Mins |
| Invitees | |
| Accepted: | Peter Smith |
| Declined: | Sandra Jones |
| Observers | |
| Bill Johnson <b.johnson@pp1.com> | |
| Notes: Unanimous agreement to re... | |

FIG. 19

| Appointment Details | |
|---|---|
| Subject: | Group Meeting |
| Location: | Board Room 1 |
| ☐ All Day Event | |
| Start: Mon. Jan. 15, 2007 10:00 AM | |
| End: Mon. Jan. 15, 2007 11:00 AM | |
| Durati | Send Changes to | Mins |
| Time | Observers? | (-5) |
| Show | YES | Busy |
| Remi | | Mins |
| Invite | No | |
| Accep | | mith |
| Declined: | Sandra Jones | |
| Observers: | | |
| Bill Johnson <b.johnson@pp1.com> | | |
| Notes: Unanimous agreement to re... | | |

FIG. 20

| From: John Domin | Help |
| Subject: Group Me | Find |
| You have been des observer for this m Start: Mon. Jan. 1 End: Mon. Jan. 1 Duration: Time Zone: Invitees: Accepted: Declined: | Select File Save Update Calendar Forward Reply Reply to All Delete Close |
| Notes: Unanimous agreement to reduce capital expenditures until end of fiscal year. | |

FIG. 22

| Appointment Details | |
|---|---|
| Subject: | Group Meeting |
| Location: | Board Room 1 |
| ☐ All Day Event Start: Mon. Jan. 15, 2007  10:00 AM End: Mon. Jan. 15, 2007  11:00 AM | |
| Duration: | 1 Hour  0 Mins |
| Time Zone: | EST (-5) |
| Show Time As: | Free |
| Reminder: | 15 Mins |
| Invitees: | |
| Accepted: | Peter Smith |
| Declined: | Sandra Jones |
| Observers: | |
| Bill Johnson <b.johnson@pp1.com> | |
| Notes: Unanimous agreement to r... | |

FIG. 23

| From: Joh | Save to Calendar |
| Subject: C | Remove me as Observer |
| You have | Delete |
| observer f | Close |
| Start: Mon. Jan. 15, 2007 10:00 AM | |
| End:  Mon. Jan. 15, 2007  11:00 AM | |
| Duration:                1 Hour  0 Mins | |
| Time Zone:                       EST (-5) | |
| Invitees: | |
| Peter Smith <p.smith@pp1.com> | |
| Sandra Jones <s.jones@pp1.com> | |

Notes:

FIG. 26

From: John Domino
Subject: Group Meeting

Bill Johnson has requested removal as an observer.
Start: Mon. Jan. 15, 2007  10:00 AM
End:   Mon. Jan. 15, 2007  11:00 AM
Duration:            1 Hour  0 Mins
Time Zone:                 EST (-5)
Invitees:
Peter Smith <p.smith@pp1.com>
Sandra Jones <s.jones@pp1.com>

Notes:

FIG. 28

| Appointment Details | |
|---|---|
| Subject:  Group Meeting<br>Location: Board Room 1 | |
| ☐ All Day Event<br>Start: Mon. Jan. 15, 2007  10:00 AM<br>End:   Mon. Jan. 15, 2007  11:00 AM<br>Duration:            1 Hour  0 Mins<br>Time Zone:                 EST (-5)<br>Show Time As:              Busy<br>Reminder:              15 Mins<br>Invitees<br>Accepted:            Peter Smith<br>Declined:            Sandra Jones | |
| Notes: | |

FIG. 29

ELECTRONIC DEVICE AND METHOD OF MEETING NOTIFICATION

FIELD OF TECHNOLOGY

The present disclosure relates to meeting scheduling and notifying interested parties of such scheduling.

BACKGROUND

Portable electronic devices including, for example, smart telephones and wireless PDAs are becoming increasingly common and typically integrate functions of personal information management such as calendaring and data communications such as e-mail, World Wide Web browsing and telecommunications in a single device. Such devices run on a wide variety of networks from data-only networks such as Mobitex and DataTAC to complex voice and data networks such as GSM/GPRS, CDMA, EDGE, UMTS and CDMA2000 networks.

It is common for individuals to use such portable electronic devices for storing calendar events for display on the device in an electronic calendar. Some portable electronic devices allow the user of the device to schedule meetings with invitees by creating a new calendar event and entering information such as the time of the meeting, the location and contact information of the invitees. An electronic message is then sent to the invitees in the form of an invitation to the meeting, typically via electronic mail (e-mail). Such electronic invitations provide the invitee with the option to accept or decline the invitation to the meeting. If accepted, the meeting is stored as a calendar event in the electronic calendar of the invitee.

In some cases, it is desirable to advise an interested party of a meeting taking place. For example, a person may wish to be advised that a particular meeting is taking place and may even be interested in the outcome. However, that person does not wish to be present at the meeting. To ensure that such a person is advised of the meeting, the organizer of the meeting can choose to simply add the interested party as an invitee and expect the invitee to decline the meeting invitation. Unfortunately, when the meeting invitation is declined, the meeting information is not saved for the interested party to view later. Alternatively, the organizer can send a separate e-mail to the interested party, after scheduling of the meeting, to advise the party of the meeting particulars. Of course, this requires that a separate e-mail be sent, duplicating much of the information already input when scheduling the meeting. Further, these efforts must be repeated in the event of changes to the meeting schedule.

Improvements in notifying interested parties of meeting scheduling are desirable.

BRIEF DESCRIPTION OF THE DRAWINGS

The embodiments described herein will be better understood with reference to the description and to the following Figures, in which:

FIGS. 5 to 11 show exemplary screens displayed on the display of the portable electronic device at various steps in the method of FIG. 4.

FIGS. 13 to 17 show exemplary screens displayed on the display of the portable electronic device at various steps in the method of FIG. 12;

FIGS. 19 and 20 show exemplary screens displayed on the display of the portable electronic device at steps in the method of FIG. 18;

FIGS. 22 and 23 show exemplary screens displayed on the display of the portable electronic device at steps in the method of FIG. 21;

FIG. 26 shows an exemplary screen displayed on the display of the portable electronic device at steps in the method of FIG. 25;

FIGS. 28 and 29 are exemplary screens displayed on the display of the portable electronic device at steps in the method of FIG. 27.

DETAILED DESCRIPTION OF THE EMBODIMENTS

In the following description, specific details are set forth for the purpose of thorough understanding and explanation of embodiments of the present application. It will be understood, however, that the present application is not limited to the specific details set forth herein. Those skilled in the art will recognize that certain structures and method steps can vary from those described herein.

Figure 1:
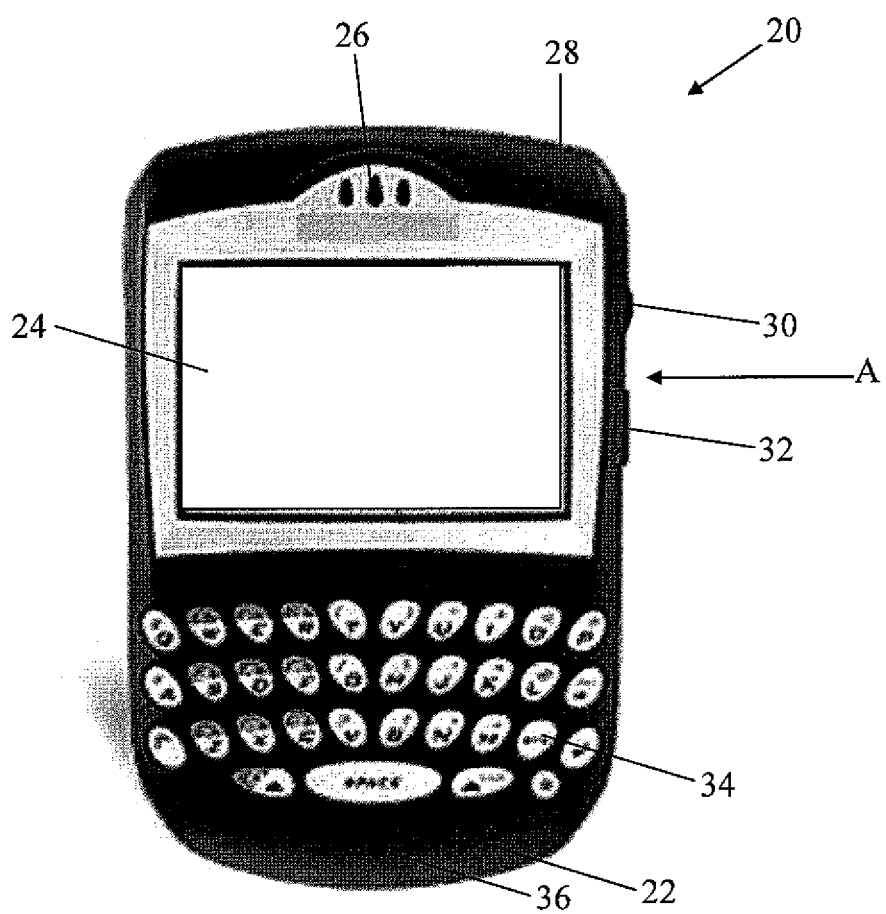
FIG. 1 is a front view of an exemplary portable electronic device according to an embodiment.

Referring to FIG. 1, an exemplary electronic device in accordance with an embodiment is indicated generally by the numeral 20. In the present embodiment, the electronic device 20 is a portable electronic device 20 based on the computing environment and functionality of a hand-held wireless communication device. It will be understood, however, that the electronic device is not limited to a hand-held wireless communication device. Other electronic devices are possible, such as cellular telephones, smart telephones, laptop computers and desktop computers. Referring again to the present embodiment, the portable electronic device 20 includes a housing 22 that frames an LCD display 24, a speaker 26, an LED indicator 28, a trackwheel 30, an exit key 32, a keypad 34, and a microphone 36. The trackwheel 30 and the exit key 32 can be inwardly depressed along the path of arrow "A" as a means to provide additional user-input. The housing 22 is made from a suitable material as will occur to those skilled in the art and can be stored, for example, in a holster (not shown) that includes an attachment for attaching to a user's belt.

Figure 2:
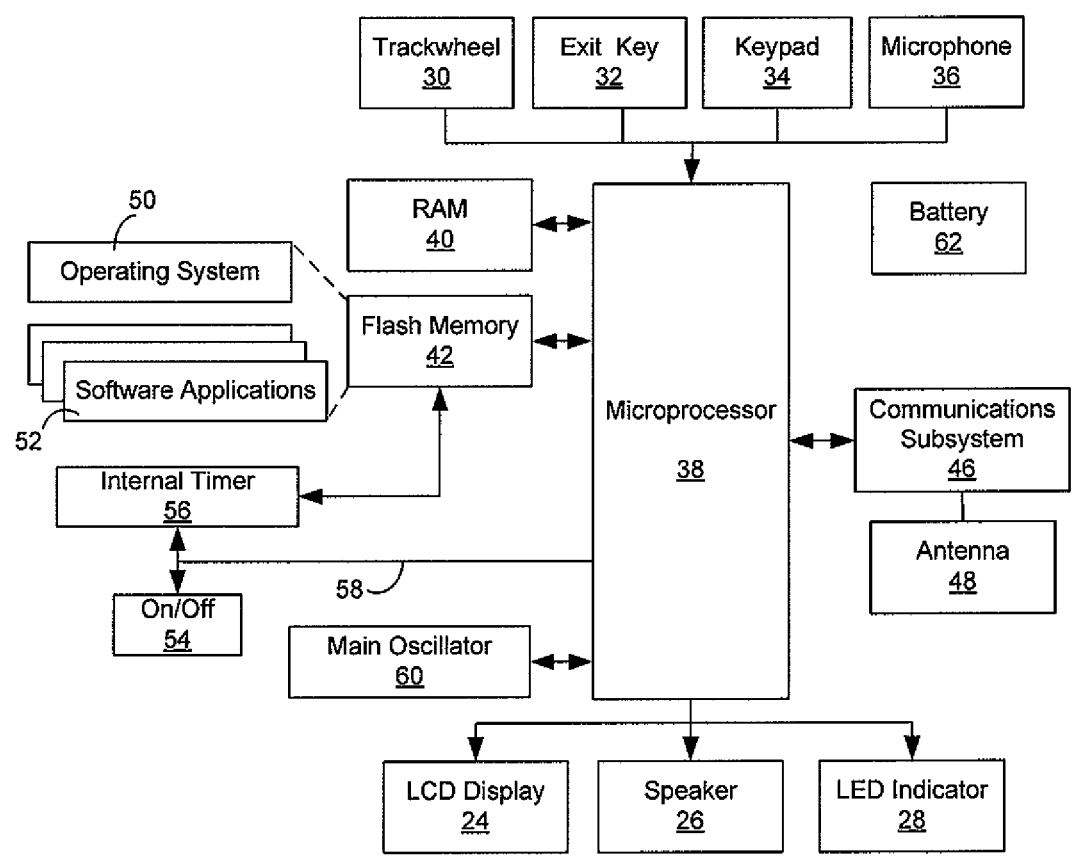
FIG. 2 is a block diagram of certain components, including internal components within the portable electronic device of FIG. 1.

Referring now to FIG. 2, a block diagram of certain components, including internal components within the portable electronic device 20, is shown. The portable electronic device 20 is based on a microcomputer that includes a microprocessor 38 connected to a random access memory (RAM) unit 40 and a persistent storage device, which in the present embodiment is a flash memory 42 that is responsible for various non-volatile storage functions of the portable electronic device 20. Operating system software 50 executable by the microprocessor 38 is stored in the flash memory 42. It will be appreciated, however that the operating system software 50 can be stored in other types of memory such as read-only memory (ROM). In the present embodiment, software applications 52 including Personal Information Manager (PIM) applications are stored in the persistent storage device 42 for execution by the microprocessor 38 for carrying out various functions. The microprocessor 38 receives input from various input devices including the trackwheel 30, the exit key 32, and the keypad 34, and outputs to various output devices including the LCD display 24, the speaker 26 and the LED indicator 28. The microprocessor 38 also interacts with on/off circuitry 54 for powering up the portable electronic device 20 and powering down the portable electronic device 20, and an internal timer 56.

In the present embodiment, the portable electronic device 20 is a two-way RF communication device having voice and data communication capabilities. The portable electronic device 20 also includes Internet communication capabilities. Two-way RF communication is facilitated by a communications subsystem 46 that is used to connect to and operate with a data-only network such as Mobitex or DataTAC, or a complex voice and data network such as a GSM/GPRS, CDMA, EDGE, UMTS or CDMA2000 network, via the antenna 48.

As indicated above, the flash memory 42 stores a plurality of applications executable by the microprocessor 38 that enable the portable electronic device 20 to perform certain operations including the communication operations referred to above. Applications software is provided including, for example, PIM applications such as an electronic mail (messages) application, an address book application, a tasks application, and a calendar application, as well as other applications such as a Web browser application, an options application and a profiles application.

In a data communication mode, a received signal such as a text message or Web page download is processed by the communications subsystem 46 and input to the microprocessor 38 for further processing of the received signal for output to the LCD display 24. A user of the portable electronic device 20 can also compose data items within a software application such as an e-mail messaging application using the keypad 34, for example, in conjunction with the trackwheel 30 and the LCD display 24. Such composed items can then be transmitted over the communications network through the communications subsystem 46 and antenna 48.

Although not shown, a short-range communications subsystem can also be provided for communication between the portable electronic device 20 and other devices or systems. Such short-range communications subsystems include, for example, an infrared device as well as associated components and circuitry, and a Bluetooth™ communication system.

A rechargeable battery 62 such as a Li-ion battery is provided for powering the portable electronic device 20.

The user can power down the portable electronic device 20 to a power-off or low-power state by pressing a power on/off button (not shown). Alternatively, the device can be powered up or powered down using a combination of buttons that activate the on/off circuitry 54. As indicated above, the portable electronic device 20 includes an internal timer 56 that can also deliver an interrupt on the interrupt line 58 to power up the portable electronic device 20 when the portable electronic device 20 is in a power-down state and to power down the device when the portable electronic device 20 is in the power-up state. The internal timer 56 is responsible for keeping track of the date and time when the portable electronic device 20 is turned off. A main oscillator 60 is also provided for generating a relatively high-frequency (MHz) clock signal compared to that generated by the oscillator that is part of the internal timer 56 (tens of kHz). The main oscillator 60 includes circuitry that operates when the portable electronic device is on for providing a clock signal to the microprocessor 38 and other components.

Figure 3:
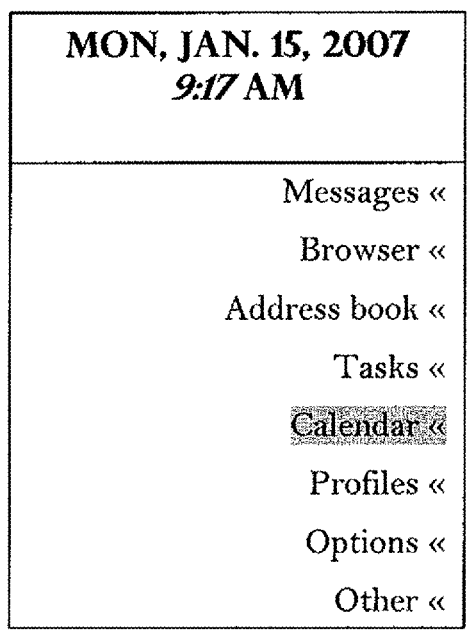
FIG. 3 is an exemplary menu screen displayed on a display of the portable electronic device of FIG. 1.

Referring to FIG. 3, there is shown an exemplary menu screen that is displayed on the LCD display 24 of the portable electronic device 20. The exemplary menu screen includes a display clock that is updated according to the circuitry of the main oscillator 60 and a list of applications including an electronic mail (Messages) application, a Web browser, an Address book, a Tasks application, a Calendar application, a Profiles application and an Options application. Each of the displayed applications in the list is selectable by, for example, scrolling to the desired application using the trackwheel 30 and pressing inwardly on the trackwheel 30 in the direction of arrow "A".

It will be appreciated that the Calendar application is used for providing a graphical user interface (GUI) for the user to create calendar events and for storage of the calendar events in a database at the flash memory 42, when executed by the processor 38. The Calendar application is used for creating, displaying and storing calendar events such as appointments, lectures, exams, movies, meetings, performances, dinners, ceremonies, etc. as described below. Each calendar event includes a variety of information including a name, a date and time of the event as well as a user-selectable reminder time for the event. For example, the calendar event can include a reminder such as an audible alarm, a visual alarm or even a kinetic alarm such as a vibration, set for a user-selected time prior to the start time of the event to thereby remind the user of the event. The calendar events are viewed using a calendar view in the Calendar application. The calendar view can be any one of a month view, a week view, a day view and an agenda view. Selection of a calendar event in the calendar view results in display of the particulars of that event.

The Messages application is used for data communication between electronic devices, in the form of SMS (Short Message Service) messages or e-mail messages. A user of the portable electronic device 20 can compose, for example, e-mail messages within the Messages application using the keypad 34, for example, in conjunction with the trackwheel 30 and the LCD display 24. Such composed items can then be transmitted over the communications network through the communications subsystem 46 and antenna 48. Similarly, messages, such as e-mail messages, can be received at the portable electronic device 20, via the antenna 48 and communications subsystem 46; further processed at the microprocessor 38 for display on the LCD display 24 using the Messages application.

A method of providing a meeting notification will now be described in accordance with an aspect of one embodiment. The method includes adding an observer to a calendar event in a calendar graphical user interface displayed on the LCD display 24 at a portable electronic device 20 of an organizer of the calendar event. The calendar event is saved associated with the observer at the organizer portable electronic device 20, and sent to a portable electronic device of an observer via an electronic message from the organizer portable electronic device 20. The electronic message includes the calendar event for storage at the observer portable electronic device with a period of time, associated with the calendar event, indicated as free time in a calendar view.

Figure 4:
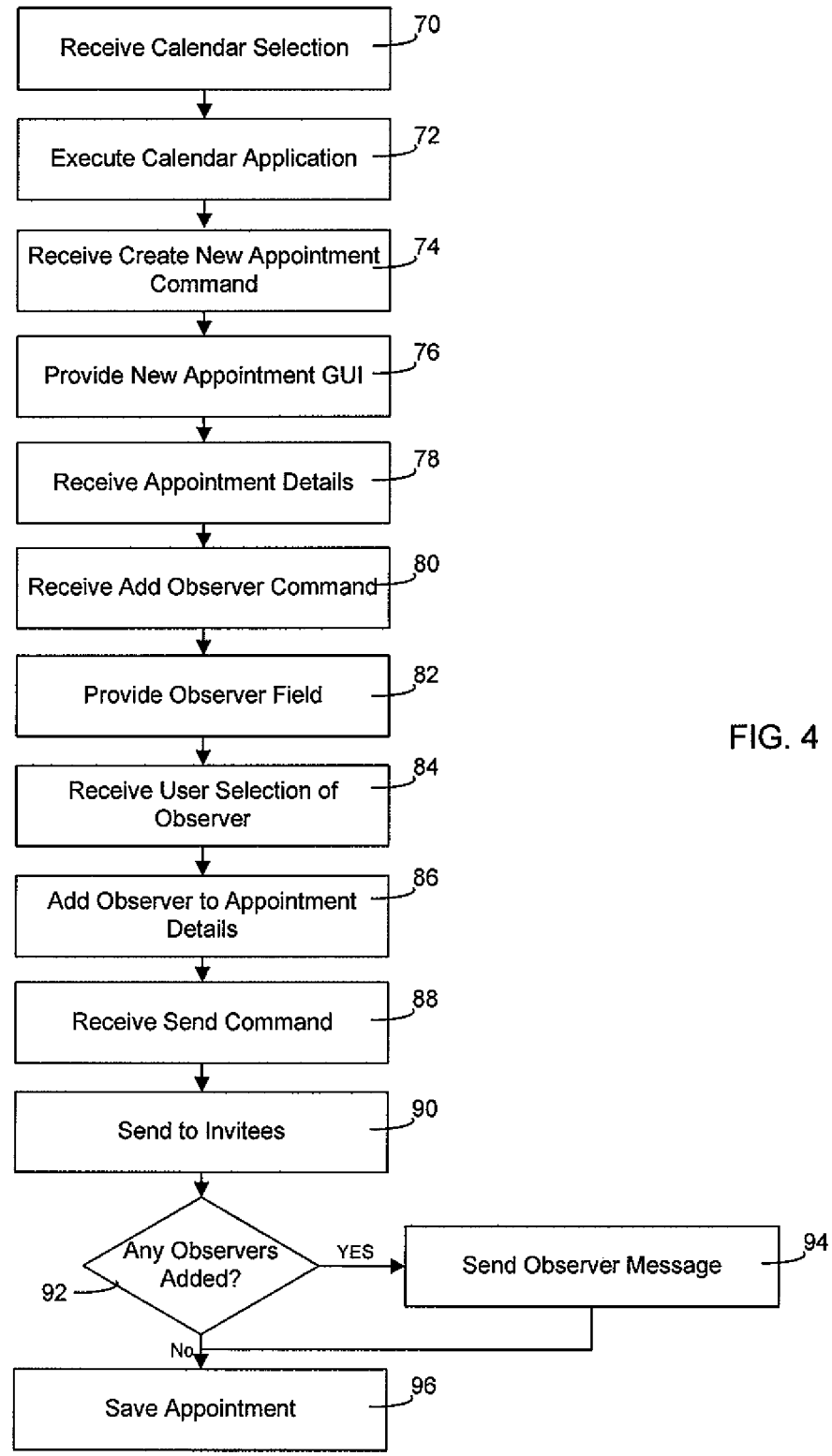
FIG. 4 is a flowchart showing the steps in a method of providing a meeting notification according to an embodiment.

Reference is now made to FIG. 4 to describe a method of providing a meeting notification in accordance with another aspect of an embodiment. It will be appreciated that the steps described in relation to FIG. 4 are carried out by routines or subroutines of the portable electronic device 20 and result from user interaction as described. Coding of software for carrying out such steps is well within the scope of a person of ordinary skill in the art.

As indicated above, FIG. 3 shows an exemplary menu screen that is displayed on the LCD display 24 of the portable electronic device 20. Selection of the Calendar application from the exemplary menu screen of FIG. 3 by, for example, scrolling to the Calendar application using the trackwheel 30, and pressing inwardly on the trackwheel 30 in the direction of arrow "A", results in receipt of the selection at the microprocessor 38 (step 70), causing the execution of the calendar application (step 72). Execution of the calendar application results in the display of a default calendar view, as shown in FIG. 5. In the example shown in FIG. 5, the default calendar view is the day view. It will be appreciated that other views such as the week, month or agenda view can be displayed depending on the default view or can be selected for display. In the calendar view, calendar events such as meetings or appointments that are calendared within a time period that falls within the calendar view and are saved in the flash memory 42, are displayed on the LCD display 24 of the portable electronic device 20. In the present example, there are no calendar events scheduled between 8:00 a.m. and 5:00 p.m. for the date displayed.

In the present example, a user of the portable electronic device 20 wishes to schedule a meeting at a particular time. For the purpose of clarity, this person is referred to as the meeting organizer herein. To schedule the meeting using the portable electronic device 20, the meeting organizer presses inwardly on the trackwheel 30 in the direction of arrow "A", resulting in the display of the submenu of user-selectable options, as shown in FIG. 6. These options include, for example, "Go To Date", "Prev Day", "Next Day", "Prev Week", "Next Week", "New", "Open", "Delete", "View Week", "View Month", and "Close", as shown in FIG. 5. Selection of the "Go To Date" option provides a user-editable date field for the user to specify a date for displaying on the LCD display 24. Selection of the "Prev Day" option results in the display of the schedule for the day prior to that displayed in FIG. 5. Similarly, selection of the "Next Day" option results in the display of the schedule for the day following that displayed in FIG. 5. Selection of the "Prev Week" option results in the display of the schedule for the week prior to the day displayed in FIG. 5. Selection of the "Next Week" option results in the display of the schedule for the week following the day displayed in FIG. 5. Selection of the "New" option provides a graphical user interface for composition of a new event for addition to the calendar display. Selection of the "Open" option results in the display of details of any selected calendar event on the LCD display 24. Selection of the "Delete" option deletes a selected calendar event. Selection of the "View Week" option results in the display of the weekly schedule for the week including the day displayed in FIG. 5. Selection of the "View Month" option results in the display of the monthly schedule for the month including the day displayed in FIG. 5. Selection of the "Close" option closes the Calendar application.

As indicated above, selection of the "New" option from the submenu displayed in FIG. 6 acts as a create-new-appointment command (step 74) and provides a graphical user interface for composition of a new calendar event for addition to the calendar display (step 76). An exemplary graphical user interface for composition of a new calendar event is show in FIG. 7. The exemplary graphical user interface shown in FIG. 7 includes fields for user-entry of event details, many of which are shown in FIG. 7, populated with data entered by the meeting organizer using the input devices such as the trackwheel 30 and the keypad 34. These fields include, for example, a "Subject", a "Location", a "Start" field, an "End" field, a "Duration", a "Time Zone", a Show Time As" field, a "Reminder" field, a list of "Invitees" and "Notes". In the example shown in FIG. 7, event details are received upon user entry (step 78). These event details include, for example, the subject "Group Meeting", the location "Board Room 1", a start date and time, an end date and time and a duration, as indicated in FIG. 7. The time zone is EST (Eastern Standard Time) and a reminder is set for 15 minutes prior to the start time of the meeting. Two invitees are included in the list of invitees. It will be appreciated that these invitees are added, by for example, user-selection of an "Add Invitee" option from a submenu, as shown in FIG. 8, followed by user entry of the an e-mail address of an invitee using the keypad 34. Alternatively, the invitee information can be added by selection of a contact from the Address book contacts stored at the portable electronic device 20, as will occur to those skilled in the art. In the present embodiment, the meeting organizer begins entry of the name of the invitee and is provided with a list of matching names from the Address book contacts, for selection. The meeting organizer can then select the appropriate name using the trackwheel 30 or continue entry of an e-mail address using the keypad 34 (step 84).

Next, the user adds an observer to the calendar event by selection of an "Add Observer" option from the submenu shown in FIG. 8. As is the case for the submenu shown in FIG. 6, the submenu shown in FIG. 8 is displayed in response to user depression of the trackwheel 30 in the present example. It will be appreciated that each submenu can be displayed as a result of any suitable user-interaction with the portable electronic device 20. The add observer command is received (step 80) and an "Observers" field is added to the appointment details (step 82). In the present embodiment, the meeting organizer begins entry of the name of the observer and is provided with a list of matching names from the Address book contacts, for selection. The meeting organizer can then select the appropriate name using the trackwheel 30 or continue entry of an e-mail address using the keypad 34. Upon receipt of selection of the meeting observer by entry by the organizer (step 84), the observer is added to the appointment details (step 86), as shown in FIG. 9. It will be understood that any indication of the identity of the observer or representation of the observer's e-mail address or the like can be used in connection with the calendar event for associating the observer with the calendar event for the purposes of the invention.

Upon completion of entry of the event details including the addition of invitees, and the addition of observers, the user then elects to send the meeting details to the invitees and the observer by selection of a "Send" command from the submenu shown in FIG. 10. Thus, a send command is received at the portable electronic device 20 (step 88) and an invitation is sent to each of the meeting invitees (step 90). The invitation is sent electronically, via e-mail, for example, which is received at an electronic device of the invitee. Opening of the e-mail results in the display of the calendar event along with options to accept the invitation or decline the invitation. Acceptance of an invitation results in the storage of the calendar event in memory of the electronic device of the invitee, for display in a calendar view and for reminding the invitee of the meeting. When displayed in a calendar view, the duration of the calendar event, between the start time and end time, is displayed as busy time. In the event that the invitee attempts to schedule another calendar event for the same time, the invitee determines that there is a conflict given that the duration is shown as busy time. Of course, if the invitee declines the invitation, the meeting is not saved at the electronic device of the invitee. When the invitee accepts or declines the invitation, a message can be sent to the meeting organizer to advise that the invitation has been accepted or declined.

In addition to sending an invitation to each of the meeting invitees, the portable electronic device 20 of the meeting organizer determines at step 90 that there is a meeting observer added to the calendar event (step 92). A notification is therefore also sent to the meeting observer (step 94) via e-mail, for example, which is received at the electronic device of the observer. The notification for the observer differs from that sent to the invitee in that there is no invitation to attend the meeting. The observer is also not presented with any options to accept or decline the meeting. Instead, the e-mail received by the observer includes the calendar event for storage at the electronic device of the observer with the duration of the calendar event between the start time and end time automatically indicated as free time.

Figure 11:

Additionally, the calendar event is also stored in the flash memory 42 at the portable electronic device 20 of the meeting organizer for display in a calendar view, as shown in FIG. 11.

Figure 12:
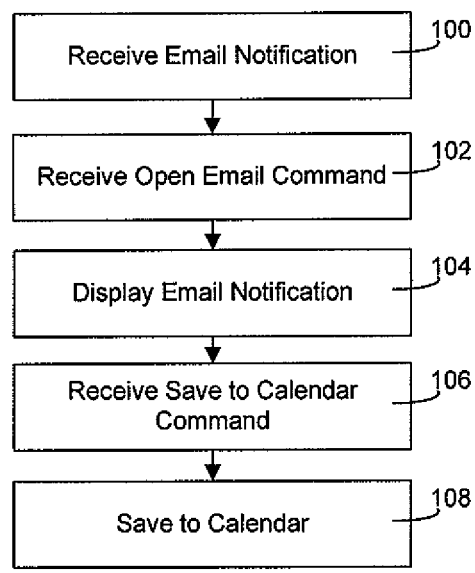
FIG. 12 is a flowchart showing the steps in a method of providing a meeting notification according to another embodiment.

Reference is now made to FIG. 12 to describe a method of providing a meeting notification in accordance with another aspect of an embodiment. It will again be appreciated that the steps described in relation to FIG. 12 are carried out by routines or subroutines of the portable electronic device. Coding of software for carrying out such steps is well within the scope of a person of ordinary skill in the art.

The e-mail notification sent from the portable electronic device 20 of the meeting organizer is received at a portable electronic device of the observer (step 100). For the purpose of the present example, the portable electronic device of the observer is similar to that of the portable electronic device of the meeting organizer. It will be appreciated, however that it is not necessary that the portable electronic devices are the same. These electronic devices can differ.

Figure 13:
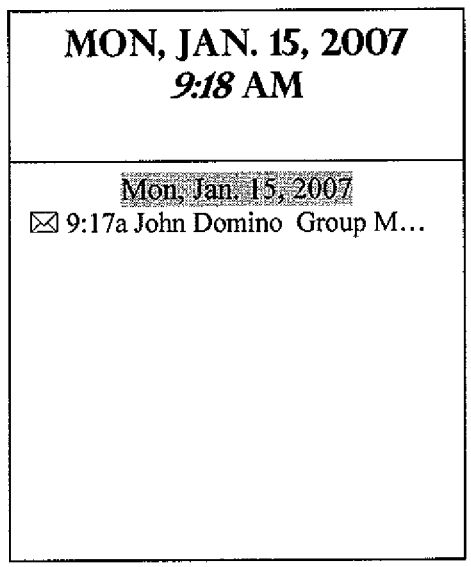
Figure 14:
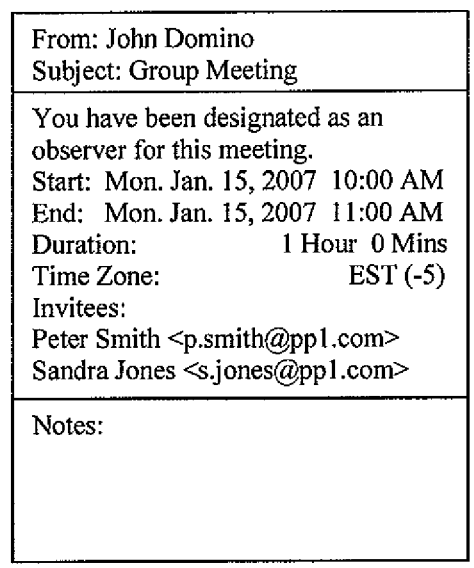

After receipt of the e-mail at the observer portable electronic device, the user selects the Messages application resulting in the display of a list of received electronic messages such as that shown in FIG. 13. In the example shown in FIG. 13, only one e-mail message is shown in the list. The observer then scrolls to the e-mail and selects an open command from an e-mail submenu, for example. Upon receipt of an open e-mail command (step 102), the electronic notification message sent from the portable electronic device 20 of the meeting organizer, is displayed at the observer portable electronic device (step 104). An exemplary electronic notification message is shown in FIG. 14. As shown, the electronic notification message indicates that the observer has been designated as an observer for the meeting. There is no option provided for accepting or declining the meeting and there is no message that is sent from the observer portable electronic device 20 to the meeting organizer portable electronic device 20 to indicate that the meeting has been accepted or declined. Clearly the notification received by the observer is not an invitation to the meeting.

Figure 15:
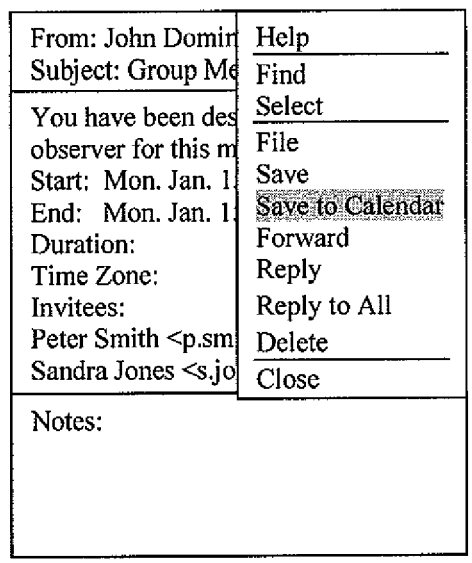
Figure 16:
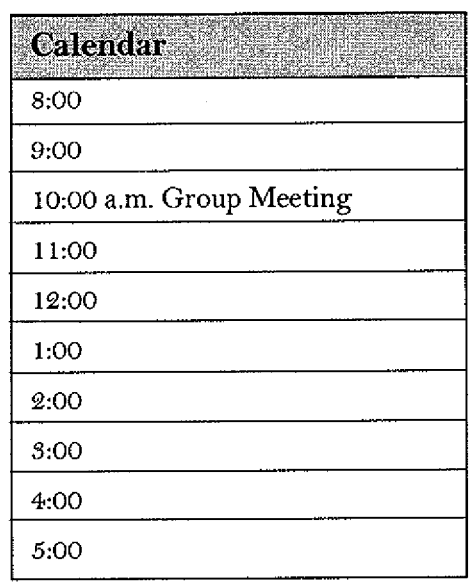

In the present example, the meeting observer can select an option to store the calendar event for storage in a calendar view by selection of a "Save to Calendar" option from a submenu when viewing the electronic message, as shown in FIG. 15. Alternatively, the calendar event can be automatically saved at the observer portable electronic device. Upon receipt of the save to calendar command (step 106), the calendar event is stored in the memory at the observer portable electronic device (step 108). Thus, execution of the Calendar application by, for example, selection of the calendar application from a menu screen such as that shown in FIG. 3, results in the display of a default calendar view. In the present example, the default calendar view is a day view for the date of the calendar event ("Group Meeting"), as shown in FIG. 16.

Selection of the "Group Meeting" from the calendar view results in the display of the event details as shown in FIG. 17. As shown, the "Show Time As" field indicates that the time is shown as free at the observer portable electronic device. Thus, the observer is free to schedule other calendar events such as meetings or appointments during that time period without conflict. In the present example, there is no reminder provided for the observer since the observer will not be attending the group meeting. It will be appreciated that a reminder can be provided, however. It is also contemplated that rather than a reminder prior to the start of the meeting, a reminder can be issued for the observer at the scheduled end of the meeting.

Figure 18:
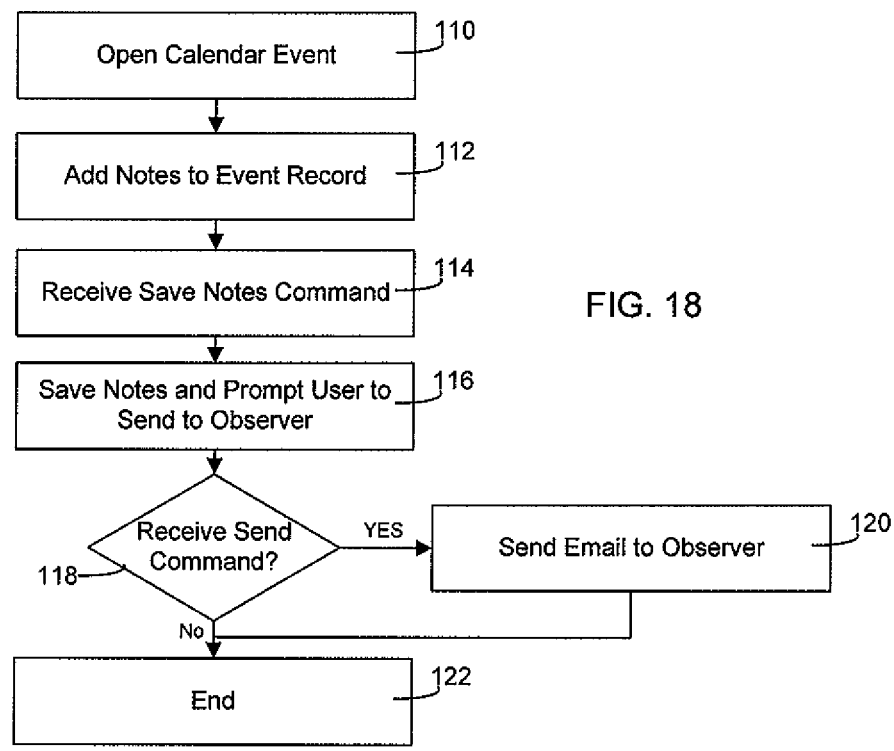
FIG. 18 is a flowchart showing the steps in a method of providing a meeting notification according to another embodiment.

Reference is now made to FIG. 18 to describe a method of providing a meeting notification in accordance with another aspect of an embodiment. It will again be appreciated that the steps described in relation to FIG. 18 are carried out by routines or subroutines of the portable electronic device 20 and result from user interaction as described. Coding of software for carrying out such steps is well within the scope of a person of ordinary skill in the art.

The meeting organizer may wish to make amendments or changes to the calendar event. For example, at the end of the "Group Meeting", the meeting organizer may wish to make a note or summary of the meeting for storage in association with the calendar event. From the calendar screen shown in FIG. 11, the meeting organizer opens the calendar event by, for example, scrolling to the "Group Meeting" and pressing inwardly on the trackwheel 30, followed by selection of an "Open" option from a calendar submenu, resulting in the display of the calendar event, as shown in FIG. 9 (step 110). In the present example, the meeting organizer scrolls to the "Notes" field and adds notes to the field to summarize the outcome of the meeting (step 112). It will be appreciated that any notes can be added. Furthermore, the amendments or changes are not limited to the "Notes" field. For example, the time may require changing if not all required attendees can attend at the time initially proposed by the meeting organizer.

After adding the notes to the "Group Meeting" calendar event, the organizer saves the notes to the calendar event by selecting the "Save" option from a list of options in a calendar event submenu, as shown in FIG. 19. Upon receipt of the save command (step 114), the calendar event is stored with the added notes and the meeting organizer is prompted to select one of a "Yes" and a "No" option for sending the changes to the observer, as shown in FIG. 20 (step 116). It will be appreciated that rather than prompting the user as to whether or not to send the changes to the observer, the changes can be sent automatically upon saving the changes to the calendared record. Alternatively, the changes can be sent to all of the invitees and the observers for the calendar event, either by prompting the organizer or automatically. In the present embodiment, selection of the "Yes" option acts as a send command (step 118) and causes an electronic message including the changes made to the calendar event, to be sent by, for example, e-mail, to the observer (step 120). Selection of the "No" option ends the subroutine without sending the changes to the observer.

Figure 21:
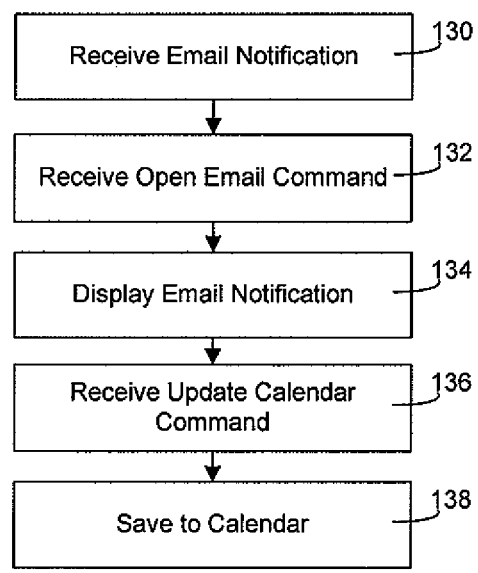
FIG. 21 is a flowchart showing steps in a method of providing a meeting notification according to another embodiment.

Reference is now made to FIG. 21 to describe a method of providing a meeting notification in accordance with another aspect of an embodiment. It will again be appreciated that the steps described in relation to FIG. 21 are carried out by routines or subroutines of a portable electronic device. Coding of software for carrying out such steps is well within the scope of a person of ordinary skill in the art.

The electronic mail notification sent at step 120 is received at the portable electronic device of the observer (step 130) and results in a message displayed in the list of received electronic messages. The open e-mail command is received (step 132) as a result of the observer opening the e-mail, as described above with reference to FIG. 13, and results in the display of the e-mail similar to that shown in FIG. 14. This e-mail, however, includes the meeting notes (as shown in FIG. 22) (step 134). Thus, the changes to the meeting are provided for the observer. In the present example, the meeting outcome is provided in the notes added by the meeting organizer at the end of the meeting. The observer can update the calendar event by selection of an "Update Calendar" option from a submenu list of options (step 136), causing the previously saved calendar event to be updated by overwriting the changed calendar event including the notes over the previously saved calendar event. Thus, the notes are saved for later viewing by the observer, as shown in FIG. 23.

In the aspects of embodiments described above, an observer is added to the event details upon creation of the new calendar event. It is possible, however, that no observer is added to the calendar event until after the event is created and saved. Thus, either the original meeting organizer or another person, such as one of the invitees, takes on an organizer role and adds the observer to the calendar event after scheduling. Rather than creating a new calendar event, the observer is added by changing the calendar event to include the observer. In this case, the observer receives an e-mail notification upon saving of the edited calendar event, rather than upon saving of a new calendar event.

Figure 24:
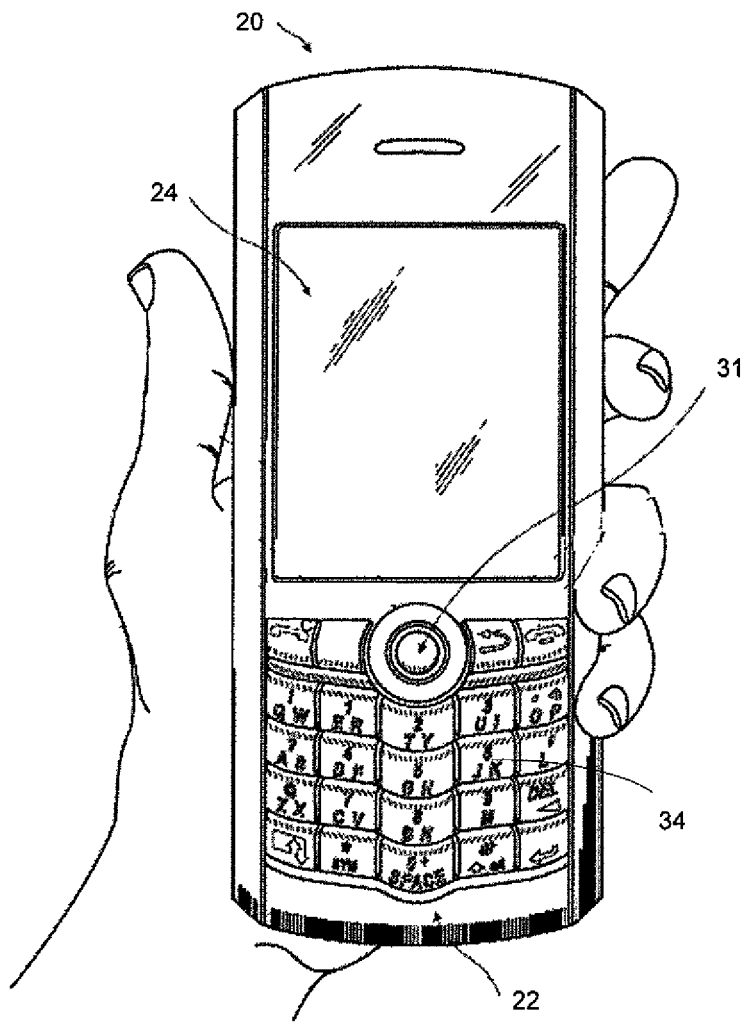
FIG. 24 is a front view of an exemplary portable electronic device, according to another embodiment.

It will be appreciated that the portable electronic device of FIG. 1 is shown for exemplary purposes only. Other portable electronic devices such as that shown in FIG. 24 are possible. Referring to FIG. 24, another exemplary portable electronic device 20 is shown. The portable electronic device 20 includes a housing 22 that frames an LCD display 24. In the present example, however, the portable electronic device 20 includes a trackball 31, rather than a trackwheel. The trackball can be depressed as a means to provide additional user-input. The microprocessor 38 receives input from the trackball 31 which is used for user selection of features from a list or a table on the LCD display 24 of the portable electronic device 22. Selection is carried out by rolling the trackball to roll a cursor (or highlighted region), for example, to the desired selection and pressing inwardly on the trackball. The portable electronic device 20 shown in FIG. 24 includes many other features, including, for example, a key pad 34 and other features similar to those described above with reference to FIG. 1. It will also be appreciated that reference is made to a trackwheel in the above description for exemplary purposes only, and a trackball 31 such as that shown in FIG. 24 can be used.

Reference is again made to FIG. 4 to describe a method of providing a meeting notification in accordance with another aspect of an embodiment. The steps shown and described above in relation to FIG. 4 are similar to those of the present example. Thus, the description of many of these steps is not repeated herein.

As in the above-described embodiment, the notification is also sent to the meeting observer (step 94) via e-mail, for example, which is received at the electronic device of the observer. Again, the notification for the observer differs from that sent to the invitee in that there is no invitation to attend the meeting. The e-mail received by the observer includes the calendar event for storage at the electronic device of the observer with the duration of the calendar event between the start time and end time indicated as free time. In the present example, however, the observer is given the option of requesting to be removed as an observer.

Figure 25:
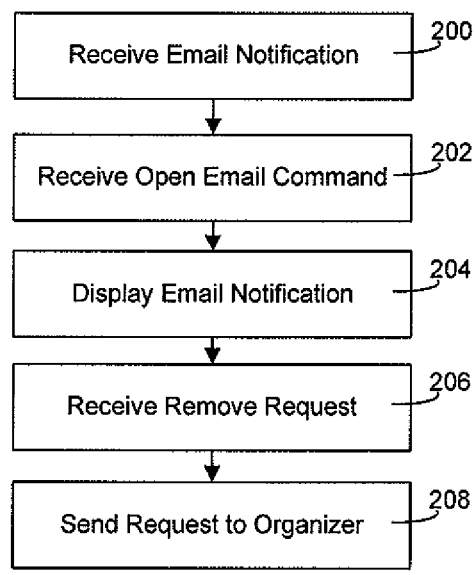
FIG. 25 is a flowchart showing steps in a method of providing a meeting notification according to another embodiment.

Referring now to FIG. 25, many of the steps described above with reference to FIG. 12 are similar to those shown in FIG. 25. It will again be appreciated that the steps described in relation to FIG. 25 are carried out by routines or subroutines of the portable electronic device. Coding of software for carrying out such steps is well within the scope of a person of ordinary skill in the art.

As described above, the e-mail notification sent from the portable electronic device 20 of the meeting organizer is received at a portable electronic device of the observer (step 200). After receipt of the e-mail at the observer portable electronic device, the user selects the Messages application resulting in the display of a list of received electronic messages such as that shown in FIG. 13. In the example shown in FIG. 13, only one e-mail message is shown in the list. The observer then scrolls to the e-mail and selects an open command from an e-mail submenu, for example. Upon receipt of an open e-mail command (step 202), the electronic notification message sent from the portable electronic device 20 of the meeting organizer, is displayed at the observer portable electronic device (step 204). An exemplary electronic notification message is shown in FIG. 14. As shown, the electronic notification message indicates that the observer has been designated as an observer for the meeting. In the present example, the meeting observer can select an option to store the calendar event for storage in a calendar view by selection of a "Save to Calendar" option from a submenu when viewing the electronic message, as shown in FIG. 26. Alternatively, the observer can select an option to request removal as an observer by selecting the "Remove me as Observer" option. Selection of the "Remove me as Observer" option (step 206) results in a request to be removed as an observer, being sent to the portable electronic device of the meeting organizer (step 208). In the present example, the calendar event is not stored in memory at the observer portable electronic device since the observer has requested to be removed as an observer.

Figure 27:
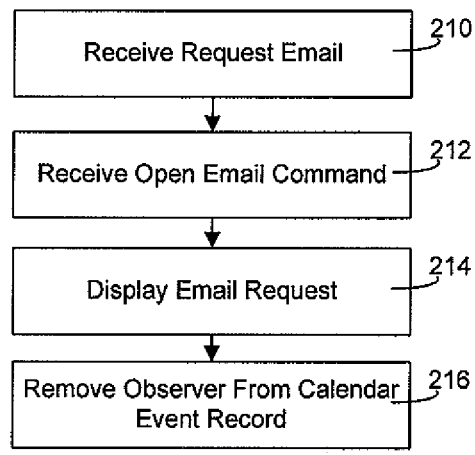
FIG. 27 is another flowchart showing steps in a method of providing a meeting notification according to another embodiment.

Referring now to FIG. 27, the steps shown and described are carried out by routines or subroutines of the portable electronic device. Coding of software for carrying out such steps is well within the scope of a person of ordinary skill in the art. The request to be removed as an observer is received via e-mail at the portable electronic device 20 of the observer at step 210. After receipt of the e-mail, the organizer selects the Messages application resulting in the display of a list of received electronic messages. The organizer then scrolls to the e-mail and selects an open command from an e-mail submenu, for example. Upon receipt of an open e-mail command (step 212), the request to be removed as an observer sent from the portable electronic device of the "observer", is displayed at the portable electronic device 20 of the organizer (step 214). An exemplary electronic notification message is shown in FIG. 28. As shown, the request indicates that the observer has requested to be removed as an observer. The observer is automatically removed from the calendar event (step 216). Thus, the next time the organizer chooses to view the calendar event, the name of the observer that has asked to be removed, is removed from the list of observers, as shown in FIG. 29. For the purposes of the present example, only one observer was designated and thus, there are no observers listed in the calendar event shown in FIG. 29. It will be appreciated that after the "observer" has requested to be removed as an observer, no further updates regarding changes to the calendar event or the addition of notes, are provided to the observer.

According to one aspect, there is provided a method of providing a meeting notification that includes adding an indication of an observer to a calendar event in a calendar graphical user interface at an organizer electronic device, saving the calendar event associated with the observer at the organizer electronic device, and sending an observer electronic message from the organizer electronic device to an observer electronic device. The observer electronic message includes the calendar event for storage at the observer electronic device with a period time, associated with the calendar event, indicated as free time.

According to yet another aspect, there is provided a electronic device including a housing, a display mounted within the housing, a user input device mounted within the housing, a memory mounted within the housing, a communications system for effecting communication to and from the electronic device, a microprocessor within the housing and connected to the memory, the user input device, the display, and the communications system, and an application for execution by the microprocessor. The application is for adding an indication of an observer to a calendar event in a calendar graphical user interface displayed on the display, saving the calendar event associated with the observer in the memory, and sending an observer electronic message to an observer electronic device via the communications system, the observer electronic message including the calendar event for storage at the observer electronic device with a period of time, associated with the calendar event, automatically indicated as free time.

According to another aspect, there is provided a computer program product for a electronic device, the computer program product including a computer-readable medium having computer-readable code embodied therein for receiving a create-new-calendar-event command and, in response, providing a create-new-calendar-event graphical user interface at the electronic device, receiving event details including an event invitee, adding an observer to the calendar event, saving the calendar event associated with the observer at the organizer electronic device, sending an invitee electronic message from the organizer electronic device to an event invitee electronic device, the invitee electronic message including an invitation for the calendar event, and sending an observer electronic message to an observer electronic device, the observer electronic message including the calendar event for storage at the observer electronic device with a period of time, associated with the calendar event, automatically indicated as free time.

Advantageously, an observer can be added to any calendar event to advise the observer (or observers) of the scheduling of the calendar event. Thus, for example, a manager can be advised of a meeting that the manager does not wish to attend but wishes to be advised of progress of. The observer is not sent an invitation. Instead, the observer is sent an electronic notification that includes the calendar event for storage at the observer electronic device with a period of time, associated with the calendar event, indicated as free time. Thus, the observer is able to schedule other calendar events, such as meetings or appointments on the electronic device, that overlap with the calendar event for which the user is designated an observer, without conflicts arising. Further, any meeting updates and any notes that are added to the meeting are sent to the observer by way of an update message.

While embodiments described herein are described by way of particular examples, it will be understood that modifications and variations to these examples are well within the scope and sphere of the present application. For example, it will be appreciated that the displayed screens can differ. As indicated, the portable electronic device can also differ while still performing the same functions. The options provided and selection of options from menus and submenus can vary while similar functions are still performed by the portable electronic device. Many other modifications and variations may occur to those skilled in the art. All such modifications and variations are believed to be within the sphere and scope of the present application.

The invention claimed is:

1. A method of providing a calendar event notification, comprising:
adding an indication of an observer to a calendar event associated with a given period of time, the indication being added in a calendar graphical user interface at an organizer electronic device via an add observer option selected from the calendar graphic user interface, the add observer option selected by receiving input from an input device of the organizer electronic device, the observer determined using further input received from the input device to one or more of: select the indication of the observer from a list of contacts stored in memory at the organizer electronic device; and receive textual input corresponding to the indication of the observer;
saving the calendar event associated with the observer in the memory, the calendar event saved in the memory with the indication of the observer in an observer field and respective indications of invitees to the calendar event in an invitee field; and
sending an observer electronic message calendar notification from the organizer electronic device to an observer electronic device, the observer electronic message calendar notification including the calendar event for storage at the observer electronic device, wherein the given period of time, associated with the calendar event, is automatically indicated as free time, the observer electronic message calendar notification differing from an invitation sent to an invitee to the calendar event in that there is no invitation to attend the calendar event and no options to accept or decline the calendar event.

2. The method according to claim 1, comprising:
receiving at the organizer electronic device, a create-new-calendar-event command and, in response, providing a create-new-calendar-event graphical user interface at the organizer electronic device, prior to the adding the indication of the observer;
receiving at the organizer electronic device, event details including an event invitee; and
sending an invitee electronic message from the organizer electronic device to an event invitee electronic device, the invitee electronic message including the invitation for the calendar event.

3. The method according to claim 1, comprising receiving at the observer electronic device, the observer electronic message and storing the calendar event such that the calendar event displays as free time in a calendar view at the observer electronic device.

4. The method according to claim 1, comprising removing the indication of the observer from the calendar event if a request to remove the observer is received at the organizer electronic device, from the observer electronic device.

5. The method according to claim 1, comprising:
receiving the observer electronic message at the observer electronic device;
providing at the observer electronic device, an option to request removal as an observer; and
sending a request for removal as an observer from the observer electronic device to the organizer electronic device in response to user selection of the option to request removal as an observer.

6. The method according to claim 5 wherein the indication of the observer is removed from the calendar event at the organizer electronic device in response to receipt of the request for removal as an observer at the organizer electronic device.

7. The method according to claim 1, comprising:
editing the event details at the organizer electronic device by changing or adding to fields of the calendar event; and
sending an update message from the organizer electronic device to the observer electronic device to provide the edited calendar event details to the observer.

8. The method according to claim 7, comprising providing a prompt at the organizer electronic device to send the update message, prior to the sending the update message.

9. The method according to claim 7, wherein the editing comprises adding notes to the calendar event, and sending the update message comprises sending the notes to the observer electronic device.

10. The method according to claim 7, comprising:
receiving at the observer electronic device, the observer electronic message and storing the calendar event at the observer electronic device such that the calendar event displays as free time in a calendar view, prior to the editing the calendar event details;
receiving the update message at the observer electronic device; and
updating the calendar event stored at the observer electronic device.

11. The method according to claim 10, comprising receiving an update calendar command at the observer electronic device, prior to the updating the calendar.

12. An electronic device comprising:
a housing;
a display mounted within the housing;
an input device mounted within the housing;
a memory mounted within the housing;
a communications system for effecting communication to and from the electronic device;
a microprocessor within the housing and connected to the memory, the input device, the display, and the communications system; and
an application for execution by the microprocessor for:
adding an indication of an observer to a calendar event, associated with a given period of time; the indication being added in a calendar graphical user interface displayed on the display via an add observer option selected from the calendar graphic user interface using the user input device, the add observer option selected by receiving input from the input device, the observer determined using further input received from the input device to one or more of: select the indication of the observer from a list of contacts stored in the memory; and receive textual input corresponding to the indication of the observer; saving the calendar event associated with the observer in the memory, the calendar event saved in the memory with the indication of the observer in an observer field and respective indications of invitees to the calendar event in an invitee field; and sending an observer electronic message calendar notification to an observer electronic device via the communications system, the observer electronic message calendar notification including the calendar event for storage at the observer electronic device, wherein the given period of time, associated with the calendar event, is automatically indicated as free time, the observer electronic message calendar notification differing from an invitation sent to an invitee to the calendar event in that there is no invitation to attend the calendar event and no options to accept or decline the calendar event.

13. The electronic device according to claim 12, wherein the application is further for receiving a create-new-calendar-event command and, in response, providing a create-new-calendar-event graphical user interface, prior to the adding the indication of the observer, receiving event details including an event invitee, and sending an invitee electronic message from the organizer electronic device to an invitee electronic device, the invitee electronic message including the invitation for the calendar event.

14. A non-transitory computer-readable medium having computer-readable code embodied therein for:
adding an indication of an observer to a calendar event associated with a given period of time the indication being added in a calendar graphical user interface at an organizer electronic device via an add observer option selected from the calendar graphic user interface, the add observer option selected by receiving input from an input device of the organizer electronic device, the observer determined using further input received from the input device to one or more of: select the indication of the observer from a list of contacts stored in memory at the organizer electronic device; and receive textual input corresponding to the indication of the observer;
saving the calendar event associated with the observer in the memory, the calendar event saved in the memory with the indication of the observer in an observer field and respective indications of invitees to the calendar event in an invitee field;
and
sending an observer electronic message calendar notification from the organizer electronic device to an observer electronic device, the observer electronic message calendar invitation including the calendar event for storage at the observer electronic device, wherein the given period of time, associated with the calendar event, is automatically indicated as free time, the observer electronic message calendar notification differing from the invitation sent to the event invitee in that there is no invitation to attend the calendar event and no options to accept or decline the calendar event.

* * * * *